United States Patent Office 3,242,212
Patented Mar. 22, 1966

3,242,212
5-CARBOXAMIDODIBENZO[a,d] [1,4]
CYCLOHEPTADIENE
Martin A. Davis and Stanley O. Winthrop, Montreal, Quebec, Canada, assignors to American Home Products Corporation, New York, N.Y., a corporation of Delaware
No Drawing. Filed Mar. 1, 1962, Ser. No. 176,783
1 Claim. (Cl. 260—558)

This invention concerns an alicyclic carboxamide, namely 5-carboxamidodibenzo [a,d][1,4]cycloheptadiene, of the following formula:

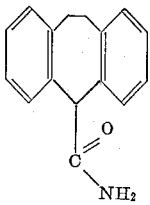

This compound may be readily prepared by the action of mineral acids on the corresponding nitrile, 5-cyanodibenzo[a,d][1,4]cycloheptadiene. A preferred acid is sulfuric acid dissolved in water or in aqueous acetic acid. The hydration of the triple bond of the nitrile takes place on heating the mixture, and the reaction is completed by heating under reflux for an appropriate period, generally between one and six hours. The product is isolated by dilution of the mixture with water, separation of the solid, and washing it with alkali in order to remove any 5-carboxydibenzo [a,d][1,4]cycloheptadiene which had formed. Filtration then gives the desired carboxamide which is purified by recrystallization.

The intermediate 5-cyano compound is prepared in excellent yield by treating a solution of 5-chlorodibenzo [a,d][1,4]cycloheptadiene in anhydrous acetonitrile with an excess of silver cyanide. The reaction is carried out at the boiling temperature of the solvent and the product is readily isolated by filtration, evaporation of the filtrate in vacuo, and recrystallization of the residue thus obtained.

In its biological actions the carboxamide of this invention possesses potent anticonvulsant effects. It protects experimental animals against the effects of administered electro-shock, this activity being elicited by both the injected or oral routes. This, coupled with a very low toxicity, indicates the use of the compound as an effective anticonvulsant agent. Recommended clinical dosages would be from 400 to 800 mg. per day given in suitably divided forms, such as tablets or capsules which may be administered orally.

The following examples will illustrate our invention to those skilled in the art, without, however, limiting it to these specific illustrations.

Example 1

5-chlorodibenzo [a,d][1,4]cycloheptadiene may be prepared by the action of thionyl chloride on 5-hydroxydibenzo [a,d][1,4]cycloheptadiene in benzene as described by Mychajlyszyn and Protiva in Coll. Czech. Chem. Commun., 24, 2955 (1959) or, more conveniently, by saturating a benzene solution of the carbinol with gaseous hydrogen chloride according to the procedure of van der Stelt, Harms and Nauta in J. Med. Pharm. Chem., 4, 335 (1961).

To a stirred suspension of silver cyanide (56.5 g., 0.42 mole) in anhydrous acetonitrile (350 ml.) was added the above 5-chloro compound (70.0 g., 0.31 mole), and the mixture was heated under reflux for twelve hours. The insoluble material was then separated from the warm mixture by filtration, and was washed with fresh acetonitrile. Removal of the solvent from the combined filtrates was done in vacuo and the residue thus obtained was recrystallized from ether-hexane or carbon tetrachloride-hexane mixture to furnish 55.7 g. of 5-cyanodibenzo [a,d][1,4]-cycloheptadiene, M.P. 92–93° C. An additional quantity of 4.3 g. was obtained from the mother liquors, thus giving a total yield of 90%.

Analysis confirmed the empiric formula $C_{16}H_{13}N$.
Required: C, 87.64; H, 5.98; N, 6.39%.
Found: C, 87.34; H, 5.92; N, 6.48%.

Example 2

The cyanide prepared in Example 1 (0.9 g.) was stirred and heated under reflux for one hour with a mixture of concentrated sulfuric acid (1 ml.), glacial acetic acid (1 ml.), and water (1 ml.). The mixture was then cooled, diluted with water, and filtered. The resulting precipitate was slurried with a little 20% aqueous sodium hydroxide solution, filtered and washed with water. Drying and recrystallization from acetonitrile gave 0.4 g. of 5-carboxamidodibenzo [a,d][1,4]cycloheptadiene as white needles, M.P. 193–194° C.

Analysis confirmed the empiric formula $C_{16}H_{15}NO$.
Required: C, 80.98; H, 6.37; N, 5.90%.
Found: C, 80.41; H, 6.31; N, 5.84%.

Example 3

A mixture of the cyanide prepared in Example 1 (26.2 g.) was heated under reflux for 5.5 hours with rapid stirring with 57% aqueous sulfuric acid (160 ml.); a solid precipitate began to form after about two hours. The cooled reaction mixture was diluted with water and processed as described in Example 2. From the alkali-insoluble portion there was obtained 4.0 g. (14% yield) of the desired carboxamide.

Acidification of the alkaline washings gave a white precipitate which was collected, dried, and recrystallized from ethylene dichloride to afford 20.1 g. (70% yield) of 5-carboxydibenzo [a,d][1,4]cycloheptadiene, M.P. 221–222° C.

Analysis confirmed the empiric formula $C_{16}H_{14}O_2$.
Required: C, 80.64; H, 5.92%.
Found: C, 80.17; H, 5.85%.

We claim:
5-carboxamidodibenzo [a,d][1,4]cycloheptadiene.

References Cited by the Examiner
UNITED STATES PATENTS 2,299,948  10/1942  Bruson _____ 260—558
2,809,208  10/1957  Miller et al. _____ 260—558

OTHER REFERENCES

Beilsteins Handbuch, volume 9, 1st suppl., page 300 (1932).

Cope et al.: Jour. Am. Chem. Soc., volume 73, pages 1673–1678 (1951).

Degering: An Outline of Organic Nitrogen Compounds, page 401, Ypsilanti, Mich., University Lithoprinters, 1950.

Migrdichian: Organic Synthesis, vol. 1, page 429, N.Y., Reinhold, 1957.

Mychajlyszyn et al.: Chem. Abs., volume 54, page 8766 (1960).

WALTER A. MODANCE, Primary Examiner.

IRVING MARCUS, JOHN D. RANDOLPH,
Examiners.

R. PRICE, N. TROUSOF, Assistant Examiners.